W. Y. THOMSON.
Cooking Vessel or Boiler.

No. 132,334. Patented Oct. 15, 1872.

Witnesses:
A. W. Almqvist
C. Sedgwick

Inventor:
Wm. Y. Thomson
PER
Attorneys.

UNITED STATES PATENT OFFICE.

WILLIAM Y. THOMSON, OF OYSTER BAY, NEW YORK.

IMPROVEMENT IN COOKING VESSELS OR BOILERS.

Specification forming part of Letters Patent No. 132,334, dated October 15, 1872.

*To all whom it may concern:*

Figure 1:
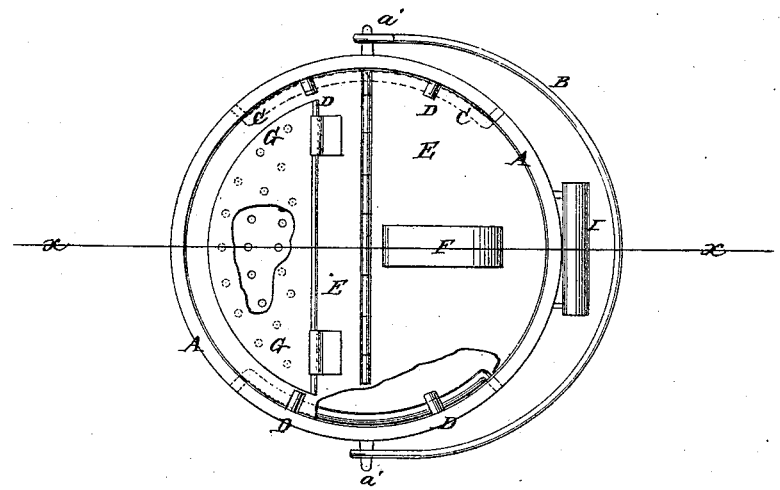
Figure 2:
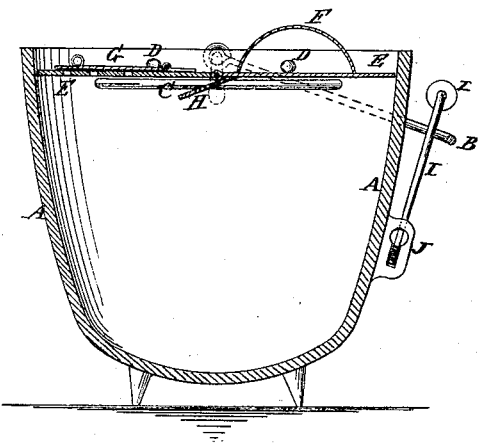

Be it known that I, WILLIAM Y. THOMSON, of Oyster Bay, in the county of Queens and State of New York, have invented a new and useful Improvement in Cooking-Vessels, of which the following is a specification:

In the accompanying drawing, Figure 1 is a top view of a kettle to which my improvement has been applied, parts of the cover being broken away to show the construction; and Fig. 2 is a detail vertical section of the same taken through the line $x \, x$, Fig. 1.

Similar letters of reference indicate corresponding parts.

My invention has for its object to furnish an improved cover for kettles and other cooking-vessels, which shall be so constructed that the liquid contents can be conveniently poured off without danger of spilling the solid contents of the vessel or scalding the hands of the operator; and it consists in the construction and combination of various parts, as hereinafter more fully described.

A represents the body of the vessel, upon the opposite sides of the upper part of which are formed lugs $a'$, to which the ends of the bail B are pivoted. Upon the upper part of the opposite sides of the inner surface of the vessel A, and directly opposite the lugs $a'$, are formed or to it are attached shoulders or flanges C, upon which the cover rests, and each of which may be in length less than a quarter of the circumference of the vessel. To the inner side of the vessel A, a little upon each side of the diameter passing through the lugs $a'$, and at a little distance above the shoulders or flanges C, are formed, or to them are attached, lugs or pins D, to keep the cover in place upon the shoulders C. E is the cover which is made in the form of two semicircular disks, hinged to each other at their straight edges. To the middle part of one of the semicircular disks is attached the handle F by which the cover is handled. In the other semicircular part of the cover E are formed a number of perforations through which the water flows out when the kettle is inclined. The perforated part of the cover is covered with a flap, G, hinged to the said semicircular disk, so that it may be pushed out by the outflowing liquid. With this construction the cover is removed by turning it one quarter around, bringing the line of the hinges into the widest spaces between the lugs or pins D, so that as the cover E is raised by the handle F the parts of the cover can be drawn out between the said lugs or pins D. The perforated part of the cover is kept from dropping down too far by a flap or plate, H, attached to the other part, so that the cover may be replaced by passing the edges of the two parts between the lugs D and pressing downward, causing the edges of the cover to slide in between the lugs or pins D and the shoulders or flanges C. Then, by turning the cover one quarter around, it will be locked into place. In pouring off the liquid contents of the vessel A the said vessel is inclined by means of the handle I, upon the lower ends of the arms of which are formed straight hooks which enter slots in the lugs J, formed upon the lower part of the said kettle. The upper parts of the slots in the lugs J are enlarged, so that when the said handle is raised to support a part of the weight, its hooks may turn freely in the said enlarged part of the said slots. This construction enables the handle to be kept from dropping down upon the stove or range and being burned or heated.

Having thus described my invention, I claim as new and desire to secure by Letters Patent—

1. The shoulders or flanges C, and the lugs or pins D formed upon or attached to the vessel A, to adapt it to receive the cover E, substantially as herein shown and described, and for the purpose set forth.

2. The cover E, made in two semicircular parts hinged to each other and provided with a handle, F, a hinged flap, G, and a stationary flap, H, substantially as herein shown and described, to adapt it to be applied to a vessel provided with the shoulders C and lugs D, as and for the purpose set forth.

3. The handle I and slotted lugs J, constructed and applied to a vessel, A, provided with an ordinary bail, B, substantially as herein shown and described, and for the purpose set forth.

WM. Y. THOMSON.

Witnesses:
 ROBERT S. SPICER,
 GEORGE S. RATHBONE.